US010565008B2

(12) United States Patent
Abali et al.

(10) Patent No.: US 10,565,008 B2
(45) Date of Patent: Feb. 18, 2020

(54) REDUCING SERVICE DOWNTIME DURING SERVICE MIGRATION

(71) Applicant: INTERNATIONAL BUSINESS MACHINES CORPORATION, Armonk, NY (US)

(72) Inventors: Bulent Abali, Tenafly, NJ (US); Hubertus Franke, Cortlandt Manor, NY (US); Thai Franck Le, White Plains, NY (US); Erich M. Nahum, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 15/222,419

(22) Filed: Jul. 28, 2016

(65) Prior Publication Data

US 2018/0246756 A1    Aug. 30, 2018

(51) Int. Cl.
*G06F 13/00*    (2006.01)
*G06F 9/48*    (2006.01)
(Continued)

(52) U.S. Cl.
CPC ........ *G06F 9/4856* (2013.01); *G06F 9/45558* (2013.01); *G06F 9/544* (2013.01);
(Continued)

(58) Field of Classification Search
CPC .... G06F 9/4856; G06F 9/544; G06F 9/45558; G06F 2009/4557; G06F 2009/45595
(Continued)

(56) References Cited

U.S. PATENT DOCUMENTS 7,904,681 B1    3/2011   Bappe et al.
8,069,218 B1    11/2011  Tormasov et al.
(Continued)

FOREIGN PATENT DOCUMENTS

EP        1962192 A1    8/2008
WO   WO2012047654 A1   4/2012
(Continued)

OTHER PUBLICATIONS

Bradford, R. et al., "LiveWide-Area Migration of Virtual Machines Including Local Persistent State," Proceedings of the 3rd international conference on Virtual execution environments, Jun. 2007. (pp. 1-11).
(Continued)

*Primary Examiner* — Kenneth R Coulter
(74) *Attorney, Agent, or Firm* — Tutunjian & Bitetto, P.C.; Kevin Michael Jordan

(57) ABSTRACT

A computer-implemented method is provided for supporting virtual machine and/or container live migration. The method may include hosting a virtual machine (VM) at a first location to be migrated to a second location by sending VM data packets from the first location to the second location and detecting a predetermined event associated with the VM at the first location. The method may further include prompting, in response to detection of the predetermined event, the redirection of the VM data packets from the first location to a buffer associated with the second location and storing the VM data packets in the buffer. The method may further include detecting an end of the predetermined event associated with the first location, and redirecting, in response to the end of the predetermined event, the VM data packets stored in the buffer to the VM migrated to the second location.

20 Claims, 9 Drawing Sheets

(51) Int. Cl.
*G06F 9/54* (2006.01)
*G06F 9/455* (2018.01)

(52) U.S. Cl.
CPC ........... *G06F 2009/4557* (2013.01); *G06F 2009/45595* (2013.01)

(58) Field of Classification Search
USPC .............................. 709/227–229, 213, 203
See application file for complete search history.

(56) References Cited

U.S. PATENT DOCUMENTS

| | | | | |
|---|---|---|---|---|
| 8,812,566 | B2* | 8/2014 | Aizman | G06F 17/30233 707/827 |
| 8,924,541 | B2* | 12/2014 | Hadas | G06F 9/4856 709/224 |
| 9,197,489 | B1 | 11/2015 | Hampiholi et al. | |
| 9,225,661 | B1* | 12/2015 | Yang | G06F 9/5077 |
| 9,571,599 | B2* | 2/2017 | Giebler | H04L 67/2823 |
| 2010/0223611 | A1 | 9/2010 | Mahalingam et al. | |
| 2012/0096171 | A1* | 4/2012 | Suit | H04L 12/6418 709/227 |
| 2012/0290630 | A1* | 11/2012 | Aizman | G06F 17/30233 707/827 |
| 2012/0303799 | A1* | 11/2012 | Hadas | G06F 9/4856 709/224 |
| 2013/0246355 | A1 | 9/2013 | Nelson et al. | |
| 2013/0254321 | A1 | 9/2013 | Johnsen et al. | |
| 2014/0189041 | A1 | 7/2014 | Mashtizadeh et al. | |
| 2015/0293773 | A1* | 10/2015 | Cai | H04L 67/28 718/1 |
| 2015/0373136 | A1* | 12/2015 | Giebler | H04L 67/2823 709/203 |
| 2016/0188378 | A1 | 6/2016 | Chao et al. | |
| 2016/0234673 | A1* | 8/2016 | Fujinami | H04W 36/0033 |
| 2018/0246756 | A1 | 8/2018 | Abali et al. | |
| 2018/0357092 | A1 | 12/2018 | Kaul | |

FOREIGN PATENT DOCUMENTS

| | | |
|---|---|---|
| WO | WO2013081662 A1 | 6/2013 |
| WO | 2013148598 A1 | 10/2013 |

OTHER PUBLICATIONS

Svard, P. et al., "Evaluation of Delta Compression Techniques for Efficient Live Migration of Large Virtual Machines," ACM SIGPLAN Notices, Jul. 2011. (pp. 1-12).

Office Action with cited art in corresponding U.S. Appl. No. 16/516,525 dated Oct. 4, 2019.

* cited by examiner

REDUCING SERVICE DOWNTIME DURING SERVICE MIGRATION

STATEMENT REGARDING FEDERALLY SPONSORED RESEARCH OR DEVELOPMENT

This invention was made with Government support under Contract No.: W911NF-06-3-0001 (1L) awarded by the Army Research Office (ARO). The Government has certain rights in this invention.

BACKGROUND

Technical Field

The present invention relates generally to computer systems, and more specifically, to supporting computer system virtualization by reducing service downtime during service migration.

Description of the Related Art

In the world of virtualization infrastructure, the term, "live migration" refers to the migration of a virtual machine (VM) from a source host computer to a destination host computer. Each host computer is a physical machine that may reside in a common datacenter. On each host, virtualization software includes hardware resource management software, which allocates physical resources to running VMs on the host and emulation software, which provides instances of virtual hardware devices, such as storage devices, network devices, etc., that interact with the guest system software, i.e., the software executing "within" each VM. Virtualization software running on each host also cooperates to perform the live migration.

An unfortunate reality is that servers must be down for a certain period of time for routine maintenance, such as applying operating system patches or hardware and/or software upgrades. Also, when old servers are replaced with new servers, the transition from one physical server to another requires interruption of service for a period of time. Transitioning, or migrating processes running on one server to another in such circumstances is generally referred to as "service migration."

SUMMARY

In accordance with one embodiment of the present principles, a computer-implemented method for supporting virtual machine live migration in a network is provided. The method includes hosting a virtual machine (VM) at a first location to be migrated to a second location by sending VM data packets from the first location to the second location and detecting a predetermined event associated with the VM at the first location. The method further includes prompting, in response to detection of the predetermined event, the redirection of the VM data packets from the first location to a buffer associated with the second location and storing the VM data packets in the buffer. The method further includes detecting an end of the predetermined event associated with the first location and redirecting, in response to the end of the predetermined event, the VM data packets stored in the buffer to the VM migrated to the second location.

In accordance with another embodiment of the present principles, a system for supporting virtual machine live migration in a network is provided. The system includes a virtual machine (VM) hosted at a first location, the VM migrated to a second location by sending VM data packets from the first location to the second location and a buffer in communication with the VM migrated to the second location. When a predetermined event occurs, the VM data packets are redirected from the first location to the buffer, and when the predetermined event ends, the VM data packets are redirected from the buffer to the VM migrated to the second location.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

Throughout the drawings, same or similar reference numerals represent the same or similar elements.

DETAILED DESCRIPTION

Figure 1:
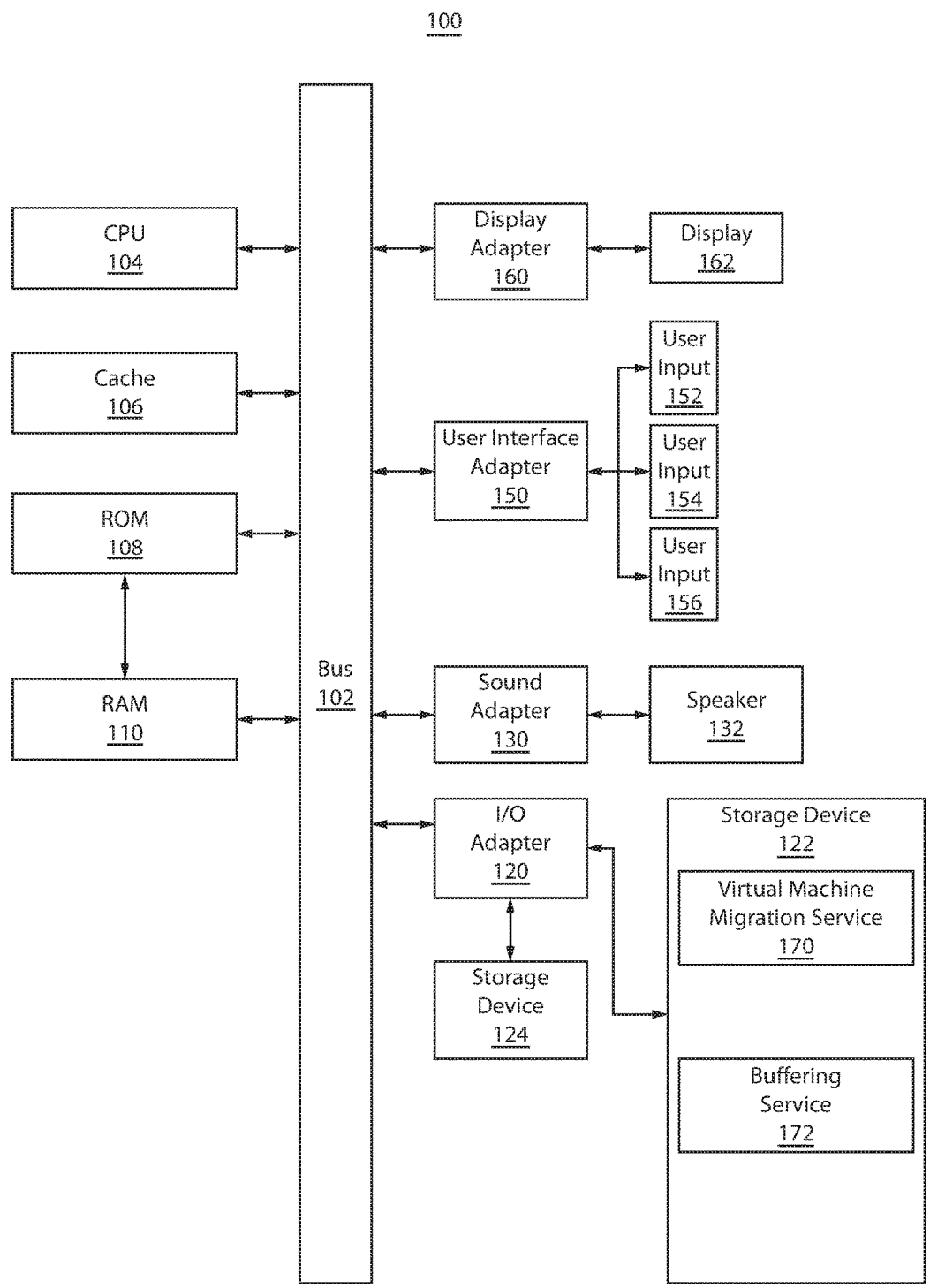
FIG. 1 is a block/flow diagram of an exemplary computing system for supporting virtual machine and/or container live migration, in accordance with an embodiment of the present principles.

The present principles are directed to systems and methods for reducing service downtime during service migration. In some embodiments, the present principles provide systems, methods and computer program products to support virtual machine (VM) and/or container live migration in a network. In some embodiments, the systems, methods and computer program products described herein may be beneficial to efficient resource utilization and elastic or flexible resource allocation in cloud computing. Live migration makes it possible to optimize resource usage by moving VMs or containers between physical servers in an application transparent manner. Thus, virtualization may enable consolidation, on-demand provisioning of resources, and elasticity/flexibility through live migration.

The systems and methods provide for virtualization technology that allows for the live migration of services in the form of VMs or containers, from a source host to a destination host. To reduce downtime during service migration, data packets are redirected from the source host and buffered at the destination host. The buffer may be incorporated within the destination host. Alternatively, the buffer may be an external buffer that is connected to the destination host. The buffer acts as a placeholder for service migration. In other words, the service migration continues between the source host to a destination host during migration service downtime because the buffer acts as a temporary source for hosting the VM or container data packets. Once the migration service downtime ends or is terminated, the buffer is disabled and the stored VM or container data packets are automatically transferred back to the destination host. This is a seamless transition, without any interruptions to the VM or container data packet flow (or the creation of the VM or container).

The systems and methods further provide for a buffer that is in the form of a buffer queue. In one embodiment, the buffer may be a snoop-TCP (transmission control protocol) cache. In another embodiment, the buffer may be a VNIC (virtual interface network card) buffer. In yet another embodiment, the buffer may be a proxy cache. In yet another embodiment, the buffer may be a container that uses a virtual switch of a hypervisor, which can direct data packets to a temporary cache. Thus, the buffer may have TCP awareness by implementing a snooping protocol. A snooping protocol is a protocol for maintaining cache coherency in symmetric multiprocessing environments.

The systems and methods further provide for redirection of VM or container data packets from a first host to a second host, where the second host receives the VM or container data packets in a buffering agent and temporarily stores such VM or container data packets in the buffering agent during a service downtime. When service downtime has ended and the migration service between the first and second hosts resumes, the second host requests the buffering agent to redirect the stored VM or container data packets to the VM or container of the second host to minimize the effect of data packet loss when service migration disruption occurs.

Referring now to the drawings in which like numerals represent the same or similar elements and initially to FIG. 1, a block/flow diagram of an exemplary computing system for supporting virtual machine and/or container live migration is presented, in accordance with an embodiment of the present principles.

An exemplary service migration processing system 100 to which the present principles may be applied is shown in accordance with one embodiment. The service migration processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. The I/O adapter 120 further communicates with a virtual machine migration service device 170 and a buffering service device 172 for supporting virtual machine and/or container live migration. The virtual machine migration service device 170 and the buffering service device 172 may be associated with the storage device 122. Such devices 170, 172 need not be incorporated within the storage device 122. Such devices 170, 172 may be external to the storage device 122. One skilled in the art may contemplate different system and networking configurations for incorporating the devices 170, 172. Moreover, the VM migration service device 170 may be replaced with a container migration service device in embodiments of the present disclosure.

A speaker 132 is operatively coupled to system bus 102 by the sound adapter 130. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 may be the same type of user input device or different types of user input devices. The user input devices 152, 154, and 156 are used to input and output information to and from service migration processing system 100.

Of course, the service migration processing system 100 may also include other elements (not shown), as readily contemplated by one of skill in the art, as well as omit certain elements. For example, various other input devices and/or output devices may be included in the service migration processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the service migration processing system 100 are readily contemplated by one of ordinary skill in the art given the teachings of the present principles provided herein.

Figure 2:
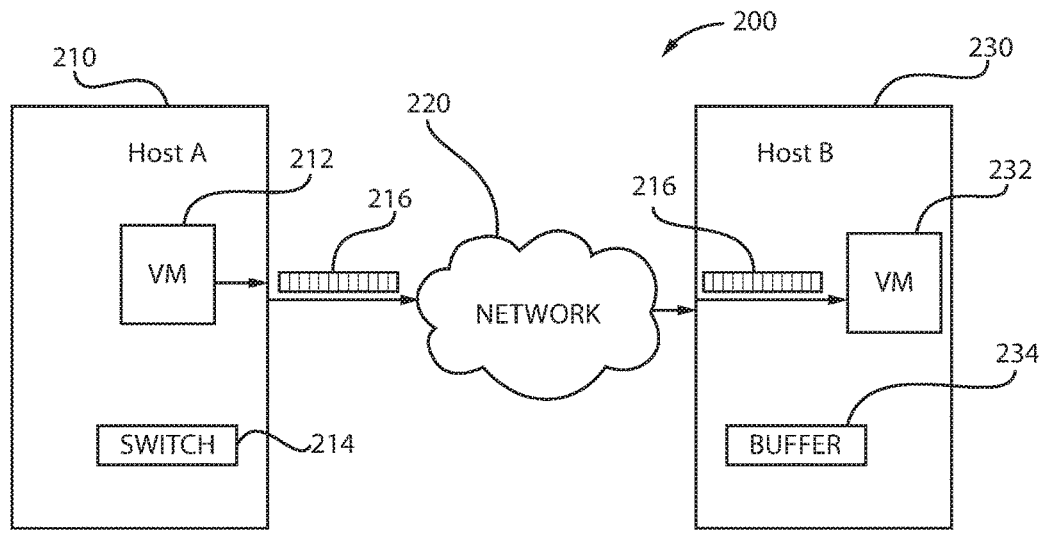
FIG. 2 illustrates a system where migration service is operational between a first host and a second host, and a buffer is incorporated within the second host, in accordance with an embodiment of the present principles.

FIG. 2 illustrates a system where migration service is operational between a first host and a second host, and a buffer is incorporated within the second host, in accordance with an embodiment of the present principles.

The system 200 includes a first host 210 (or Host A) connected to a second host 230 (or Host B) via a network 220. The first host 210 includes a virtual machine (VM) 212 and a switch 214. The second host 230 includes a VM 232 and a buffer 234. The first host 210 may be referred to as the origin host and the second host 230 may be referred to as the destination host. The first host 210 sends data packets 216 to the second host 230 via the network 220. The data packets 216 are received by the VM 232 of the second host 230.

VM refers to the concept of virtual machines, operating system containers, and set of processes that are accessible by one or more network interfaces. A VM is a software program or operating system (OS) that not only exhibits the behavior of a separate computer, but is also capable of performing tasks, such as running applications and programs like a separate computer. A VM, usually known as a guest, is created within another computing environment referred to as a "host." Multiple VMs may exist within a single host at one time. VMs are implemented by software emulation methods or hardware virtualization techniques. Depending on their use and level of correspondence to any physical computer, VMs may be divided into two categories. One category relates to system VMs and another category relates to process VMs.

The VM concept described herein includes or covers the concept of "containers." Container-based virtualization, also called operating system (OS) virtualization, is an approach to virtualization in which the virtualization layer runs as an application within the OS. In this approach, the operating system's kernel runs on the hardware node with several isolated guest VMs installed on top of it. The isolated guests are called containers.

As used herein, the term "operating system container" refers to a virtual operating system having its own OS name space, including process, file system, interprocess communication (IPC), hostname, and network space. An OS container, as defined herein, is implemented, for example, within an OS environment and logically isolated from other applications, processes, and OS executed within that same OS environment.

The terms VM and container may be used interchangeably herein. Thus, containers may be run on physical hardware just like a VM. In other words, the VMs described and depicted herein may be replaced with or interchanged with containers.

In the system 200 of FIG. 2, the migration service is operational. The migration service concept primarily deals with the process of effectively transferring or migrating a cloud-hosted application to another cloud provider or within a private cloud facility. In the instant case, data packets are transferred or migrated from the first host 210 to the second host 230. Live migration refers to the process of moving a running VM or application between different physical machines without disconnecting the client or application. Memory, storage, and network connectivity of the virtual machine are transferred from the original guest machine (e.g., first host 210) to the destination machine (e.g., second host 230).

Live migration may involve copying the VM execution state from the origin host 210 to the destination host 230. The VM execution state may comprise the memory state, the virtual processor state, the virtual devices state, and/or the connectivity state.

In one embodiment, a migration agent may copy the execution state of the VM 212 being migrated, including a plurality of memory pages, from the origin host (e.g., first host 210) to the destination host (e.g., second host 230), while the VM 212 is still running at the origin host 210. Upon completing the memory copying operation, the migration agent may re-copy the memory pages which have been modified, or became "dirty," during the memory copying operation. The migration agent may iteratively repeat the copying of dirty memory pages, until a pre-defined convergence condition has been met, e.g., until the memory pages "dirtying" rate becomes less than or equal to the VM state transfer rate.

In conventional systems, when the convergence condition is met, the VM 212 may be stopped at the origin host 210, the dirty memory pages may be copied to the destination host, and the VM 212 may be restarted at the destination host 230. However, in the example embodiments, the VM 212 is not stopped. Instead, the data packets 216 of the VM 212 are temporarily transferred to the buffer 234 of the destination host 230, which acts as a placeholder for the data packets 216. This is a seamless transition, without any interruptions to the data flow and without the need to stop the VM 212 of the first host 210. Additionally, it is noted that the redirected VM data packets are processed or buffered at the destination machine or second host 230.

Consequently, the buffer 234, which is in communication with the second host 230, is activated during migrated service downtime events to temporarily store the data packets 216 received from the first host 210 in a seamless manner, as described below with reference to FIG. 3. In this example, the buffer 234 is incorporated within the second host 230.

Figure 3:
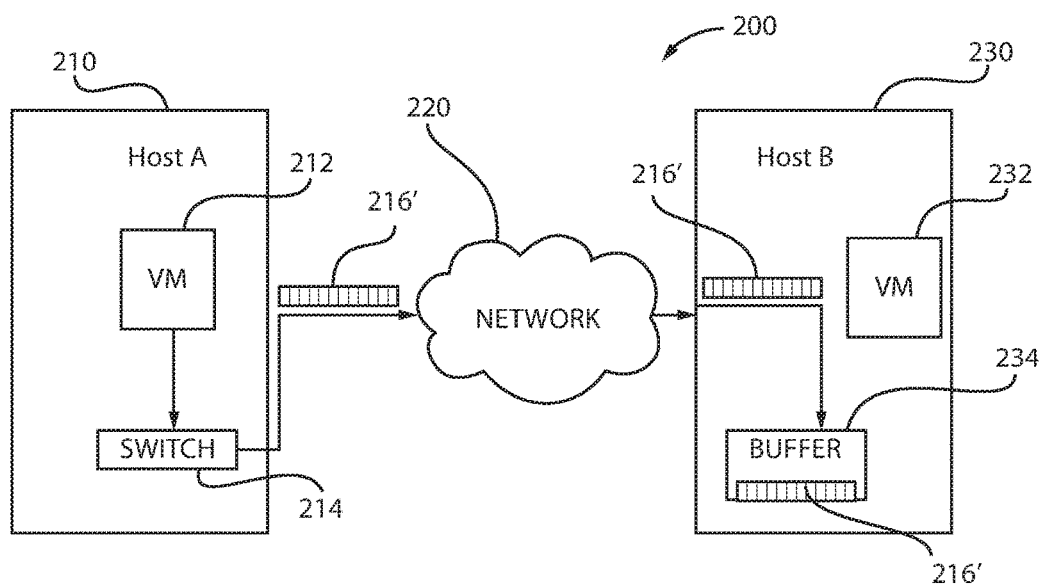
FIG. 3 illustrates the system of FIG. 2 when the migrated service is unavailable due to detection of a service downtime event, in accordance with an embodiment of the present principles.

FIG. 3 illustrates the system of FIG. 2 when the migrated service is unavailable due to detection of a service downtime event, in accordance with an embodiment of the present principles.

When a service downtime event is detected by the system 200, then the migrated service is not available between the VM 212 of the first host 210 and the VM 232 of the second host 230. During this time, in conventional systems, the data packets are dropped and delivered back to the origin host. In contrast, in the example embodiments, the data packets 216' are redirected to the buffer 234 of the second host 230 via the network 220. The data packets 216' are redirected from the first host 210 by the switch 214. The switch 214 may also be a network interface card. One skilled in the art may contemplate using any type of network switch, which is a computer networking device that connects devices together on a computer network, by using packet switching to receive, process and forward data to the destination device. The network switch forwards data only to one or multiple devices that need to receive it, rather than broadcasting the same data out of each of its ports.

Thus, the data packets 216' are redirected and temporarily stored in the buffer 234 of the second host 230. In one embodiment, the buffer 234 may be a virtual network interface card (VNIC) buffer. The VNIC buffer size may be increased before migration and may be restored to its original size after migration. The VNIC buffer may be dynamically increased until a watermark is reached and restored to its original size after the migrated service has resumed between the first and second hosts 210, 230.

In another embodiment, the buffer 234 may be a proxy cache. The proxy cache may store packets destined for the VM 232 of the second host 230. When service downtime has ended, the proxy cache may be notified to forward the stored packets to the VM 232 of the second host 230. Additionally, the packets stored in the proxy cache may be removed or deleted after the migrated service is restored. For example, the second host 230 may send a notification to the proxy cache to remove or delete the data packets stored during service downtime. Of course, the data packets stored in the proxy cache may be automatically removed or deleted after a predetermined period of time, say, 30 seconds after service downtime has ended.

In another embodiment, the buffer 234 may be a container. A container is a solution to the problem of how to get software to run reliably when moved from one computing environment to another or from one VM to another. A container consists of an entire runtime environment: an application, plus all its dependencies, libraries and other binaries, and configuration files needed to run it, bundled into one package. By containerizing the application platform and its dependencies, differences in OS distributions and underlying infrastructure are abstracted away.

With virtualization technology, the package that may be passed around is a virtual machine and it includes an entire operating system, as well as the application. For example, a physical server running three virtual machines would have a hypervisor and three separate operating systems running on top of it. In contrast, a server running, for example, three containerized applications runs a single operating system, and each container shares the operating system kernel with the other containers. Shared parts of the operating system are read only, while each container has its own mount (i.e., a way to access the container) for writing. That means the containers are much more lightweight and use far fewer resources than VMs. However, VMs and containers may be used interchangeably throughout the present principles.

In one example embodiment, if the buffer 234 is a container, the container may use a virtual switch of a hypervisor, which may redirect data packets to a temporary cache, such as a proxy cache described above. When containers use native networking (only port), then as part of the container migration, the port must be established at the destination operating system (OS), whereas the OS may then handle the data packets (even if received when the container process is not yet active).

One skilled in the art may contemplate a variety of different buffering agents to temporarily store VM data packets during a detected migrated service downtime.

Figure 4:
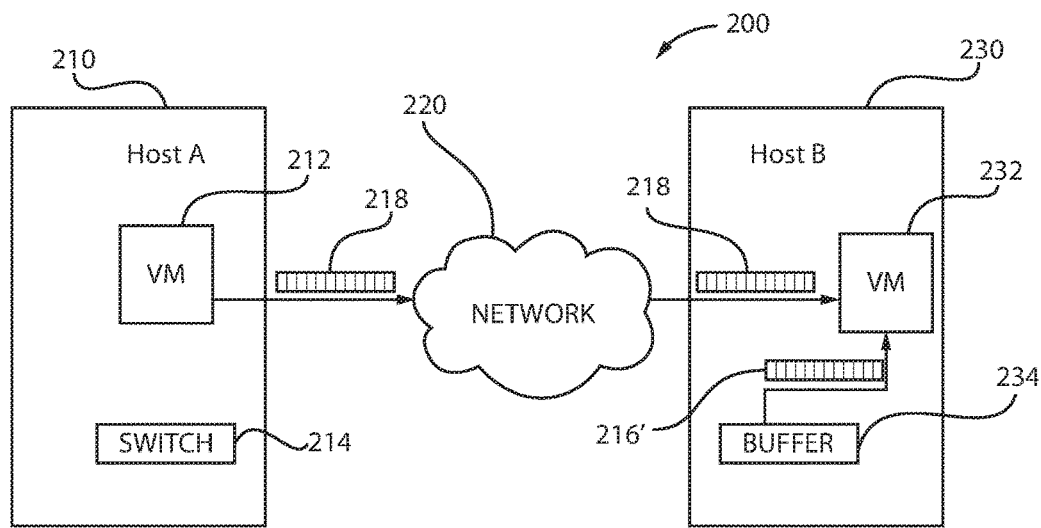
FIG. 4 illustrates the system of FIG. 2 when the migrated service resumes operation after completion of the service downtime event, in accordance with an embodiment of the present principles.

FIG. 4 illustrates the system of FIG. 2 when the migrated service resumes operation after completion of the service downtime event, in accordance with an embodiment of the present principles.

When the migrated service downtime event has ended, the remaining data packets 218 of the VM 212 of the first host 210 are sent to the VM 232 of the second host 230 via the network 220. Additionally, the VM data packets 216' stored in the buffer 234 are also redirected to the VM 232 of the second host 230. Thus, the VM 232 receives two data streams. A first data stream 216' and a second data stream 218. The first data stream 216' is received from the buffer 234 and includes VM data packets stored during service downtime and the second data stream 218 is received from the first host 210 and includes the remaining VM data packets. During this time, the switch 214 of the first host 210 is deactivated, as the VM data packets need not be redirected to the buffer 234, as the migrated service between the first and second hosts 210, 230 has been restored.

Regarding FIGS. 2-4, the buffer 234 may be activated by a notification received from the second host 230. The second host 230 may communicate to the buffer 234 that the switch 214 of the first host 210 has been activated, which would provide automatic notification to the buffer 234 to start receiving VM data packets from the VM 212 of the first host 210. Therefore, a signal may be sent from the first host 210 to the second host 230 to activate the buffer 234 associated with or in communication with the second host 230. The signal may be sent automatically when a service downtime event is detected by the first host 210. Moreover, the VM data packets are explicitly or exclusively sent to the second host 230.

Regarding FIGS. 2-4, during service downtime, the second host 230 may check whether the data packets arriving from the first host 210 are indeed VM data packets. If the data packets received by the second host 230 are VM data packets, then such VM data packers are stored in the buffer 234 of the second host 230. However, if some of the data packets received by the second host 230 are not identified or designated as VM data packets, then such packets may be discarded or redirected back to the first host 210 or may be redirected to another buffer not associated with buffer 234. Therefore, the buffer 234 of the second host 230 is exclusively programmed to receive only VM data packets from the first host 210.

Regarding FIGS. 2-4, when service downtime has ended, and when the migrated service resumes between the first host 210 and the second host 230, the second host 230 sends a signal or message or indication to the buffer 234 to transmit the VM data packets stored in the buffer 234 to the VM 232 of the second host 230. The buffer 234 complies with the request forwarded by the second host 230 and sends all the stored VM data packets to the VM 232 of the second host 230. Moreover, the second host 230 sends a signal or message or indication to the first host 210 to cease or terminate or end redirection of the VM data packets to the buffer 234 and instead redirect the remaining VM data packets to the VM 232 of the second host 230. Thus, the first host 210 is made aware that service downtime has ended and that service may resume by sending VM data packets directly to the VM 232 of the second host 230. The first host 210 may also be made aware that the buffer 234 has been deactivated (by the second host 230), which may prompt the first host 210 to deactivate the switch 214.

Figure 5:
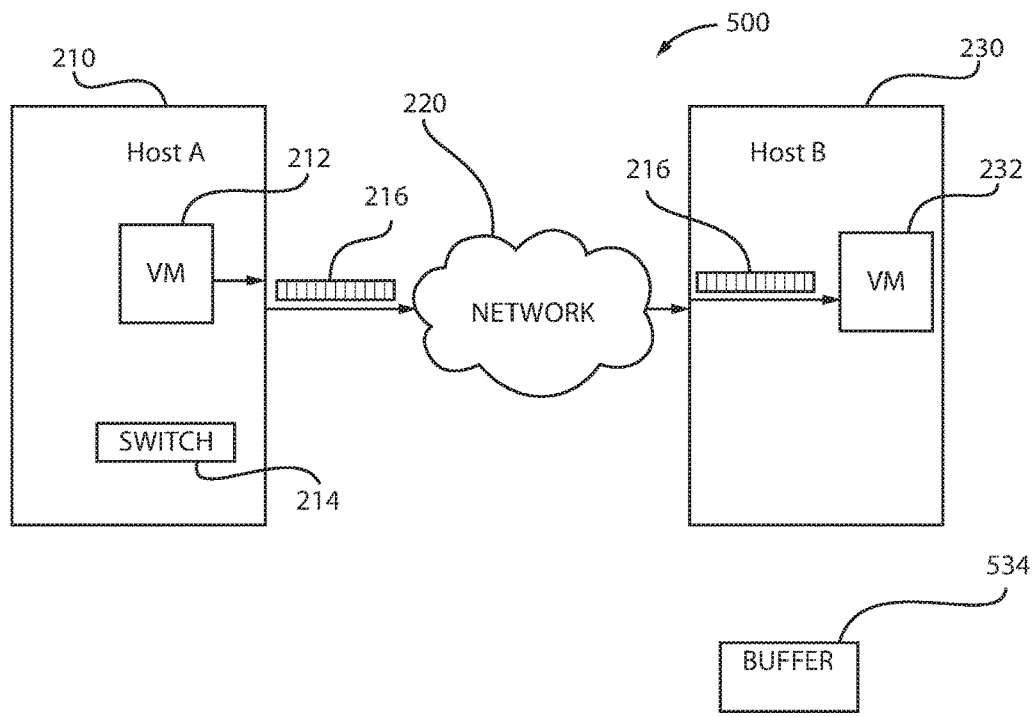
FIG. 5 illustrates a system where a migration service is operational between a first host and a second host, and an external buffer is in communication with the second host, in accordance with an embodiment of the present principles.

FIG. 5 illustrates a system where migration service is operational between a first host and a second host, and an external buffer is in communication with the second host, in accordance with an embodiment of the present principles.

The system 500 depicts the buffer 534 positioned outside or external to the second host 230. The buffer 534 may be referred to as an external buffer. The buffer 534 may wirelessly communicate with the second host 230. The buffer 534 may be remotely located with respect to the second host 230. However, in one example embodiment, the buffer 534 is within the vicinity of the second host 230. The buffer 534 communicates only with the second host 230.

As shown, the migration service is operational. In other words, the first host 210 sends data packets directly to the second host 230, without intervention from the buffer 534 of the second host 230 and without intervention from the switch 214 of the first host 210. When a service disruption occurs, the buffer 534 is activated.

Figure 6:
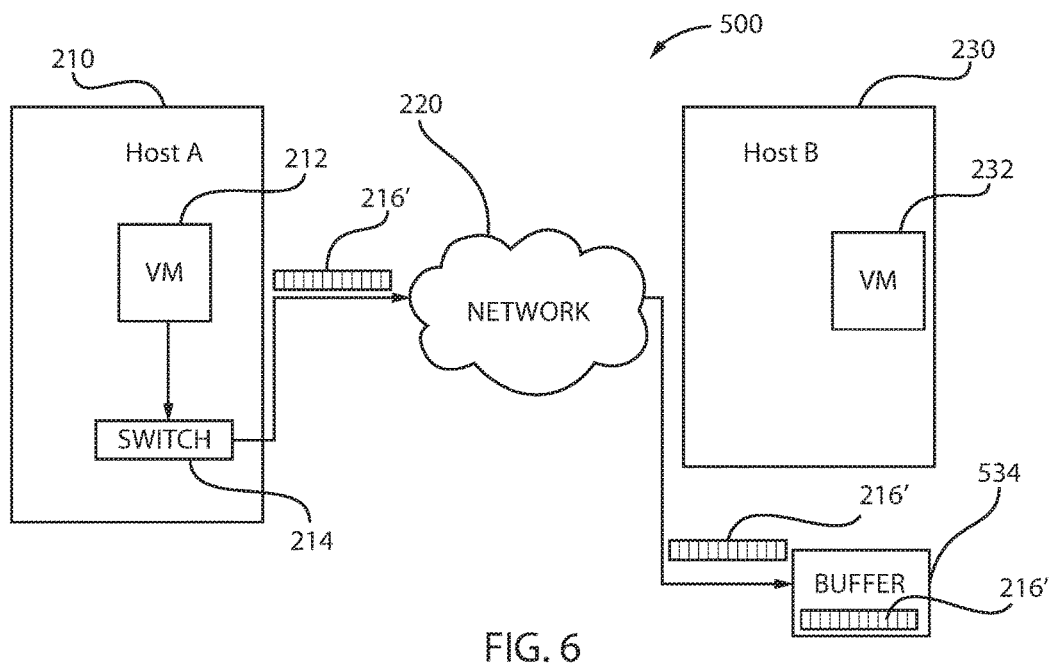
FIG. 6 illustrates the system of FIG. 5 when the migrated service is unavailable due to detection of a service downtime event, in accordance with an embodiment of the present principles.

FIG. 6 illustrates the system of FIG. 5 when the migrated service is unavailable due to detection of a service downtime event, in accordance with an embodiment of the present principles.

The buffer 534 is activated due to a detection of a disruption, such as, for example, a service downtime event. The data packets 216' are redirected to the buffer 534 of the second host 230 via the network 220. The data packets 216' are redirected from the first host 210 by the switch 214. The switch 214 may also be a network interface card. Therefore, the data packets 216' are redirected and temporarily stored in the buffer 534 of the second host 230 during the disruption.

Figure 7:
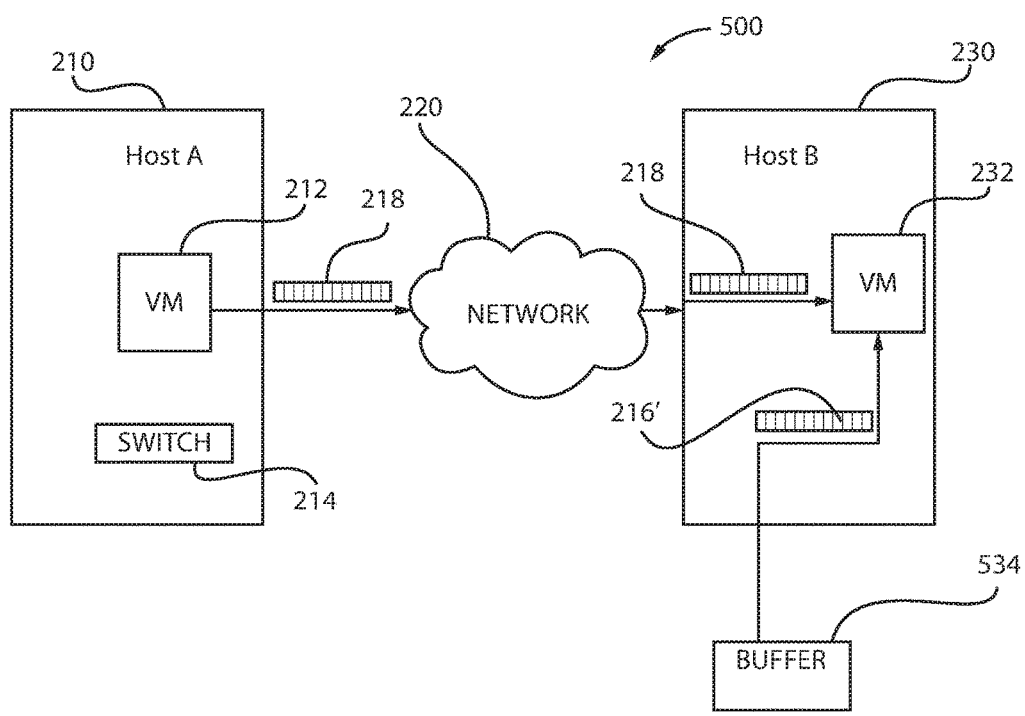
FIG. 7 illustrates the system of FIG. 5 when the migrated service resumes operation after completion of the service downtime event, in accordance with an embodiment of the present principles.

FIG. 7 illustrates the system of FIG. 5 when the migrated service resumes operation after completion of the service downtime event, in accordance with an embodiment of the present principles.

When the migrated service downtime event has ended, the remaining data packets 218 of the VM 212 of the first host 210 are sent to the VM 232 of the second host 230 via the network 220. Additionally, the VM data packets 216' stored in the buffer 534 are also redirected to the VM 232 of the second host 230. Thus, the VM 232 receives two data streams. A first data stream 216' and a second data stream 218. The first data stream 216' is received from the buffer 534 and includes VM data packets stored during service downtime and the second data stream 218 is received from the first host 210 and includes the remaining VM data packets. The switch 214 of the first host 210 is deactivated, as the VM data packets need not be redirected to the buffer 534, as the migrated service has been restored.

In other embodiments, the switch 214 may not be incorporated within the first host 210, as shown in FIGS. 2-7. Instead, the switch 214 may be a separate and distinct component that is remotely located with respect to the first host 214.

Figure 8:
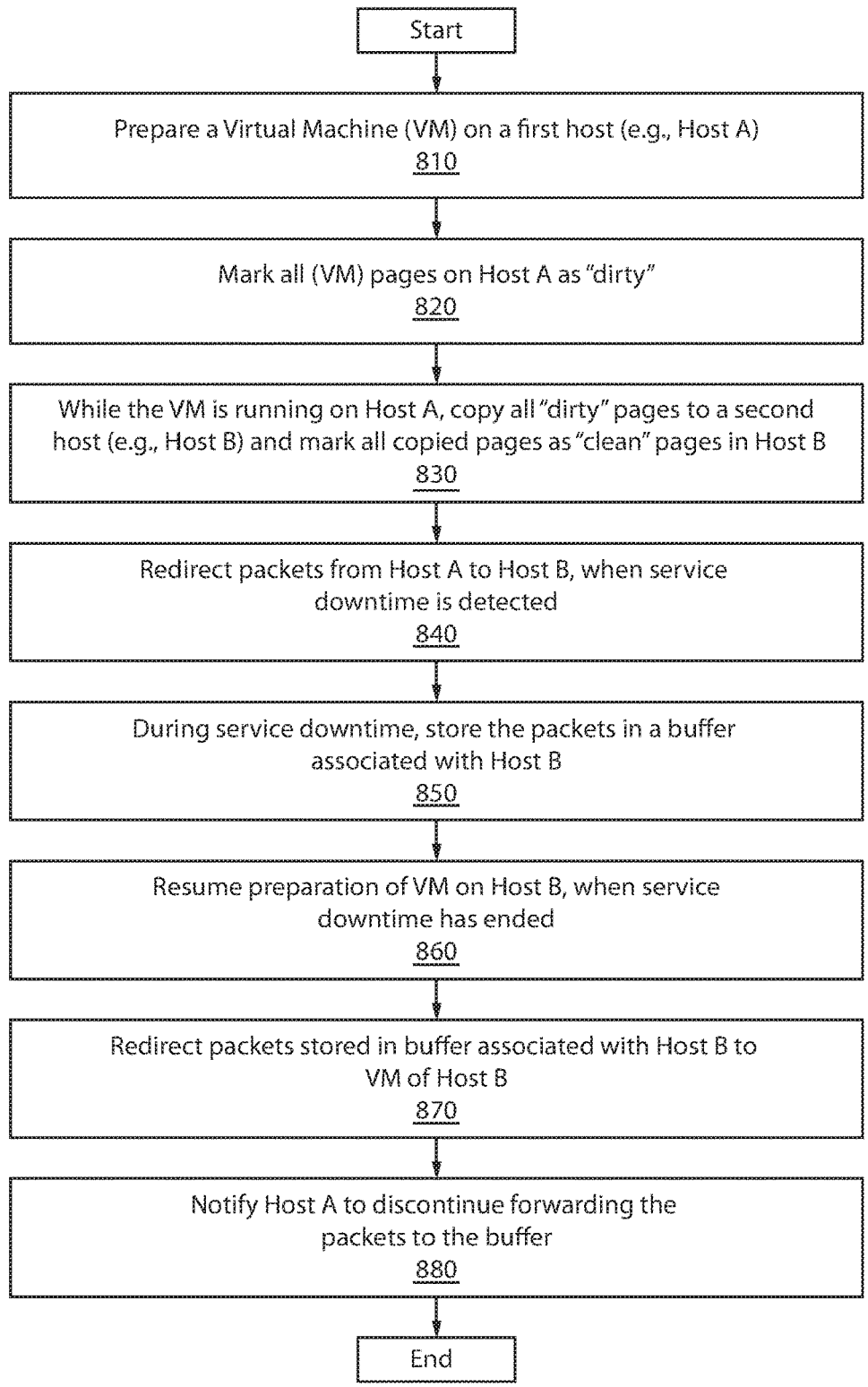
FIG. 8 is a block/flow diagram of an exemplary method for supporting at least virtual machine live migration where "dirty pages" are processed between two hosts, in accordance with an embodiment of the present principles.

FIG. 8 is a block/flow diagram of an exemplary method for supporting at least virtual machine live migration, in accordance with an embodiment of the present principles.

At block 810, a VM is prepared on a first host (e.g., Host A).

At block 820, all the VM pages of Host A are marked or designated as "dirty."

At block 830, while the VM is running on Host A, all the "dirty pages" are copied to a second host (e.g., Host B). Additionally, all the copied pages are marked or designated as "clean" pages by the Host B.

At block 840, the VM data packets are redirected from Host A to Host B, when service downtime is detected.

At block 850, during service downtime, the VM data packets are stored in the buffer associated with the Host B.

At block 860, preparation of the VM on Host B is resumed, when the service downtime has ended.

At block 870, the VM data packets stored in the buffer associated with Host B are redirected to the VM of Host B.

At block 880, notify Host A to discontinue forwarding the packets to the buffer.

It is noted that the steps/blocks of FIG. 8 could be applied to containers instead of VMs.

Figure 9:
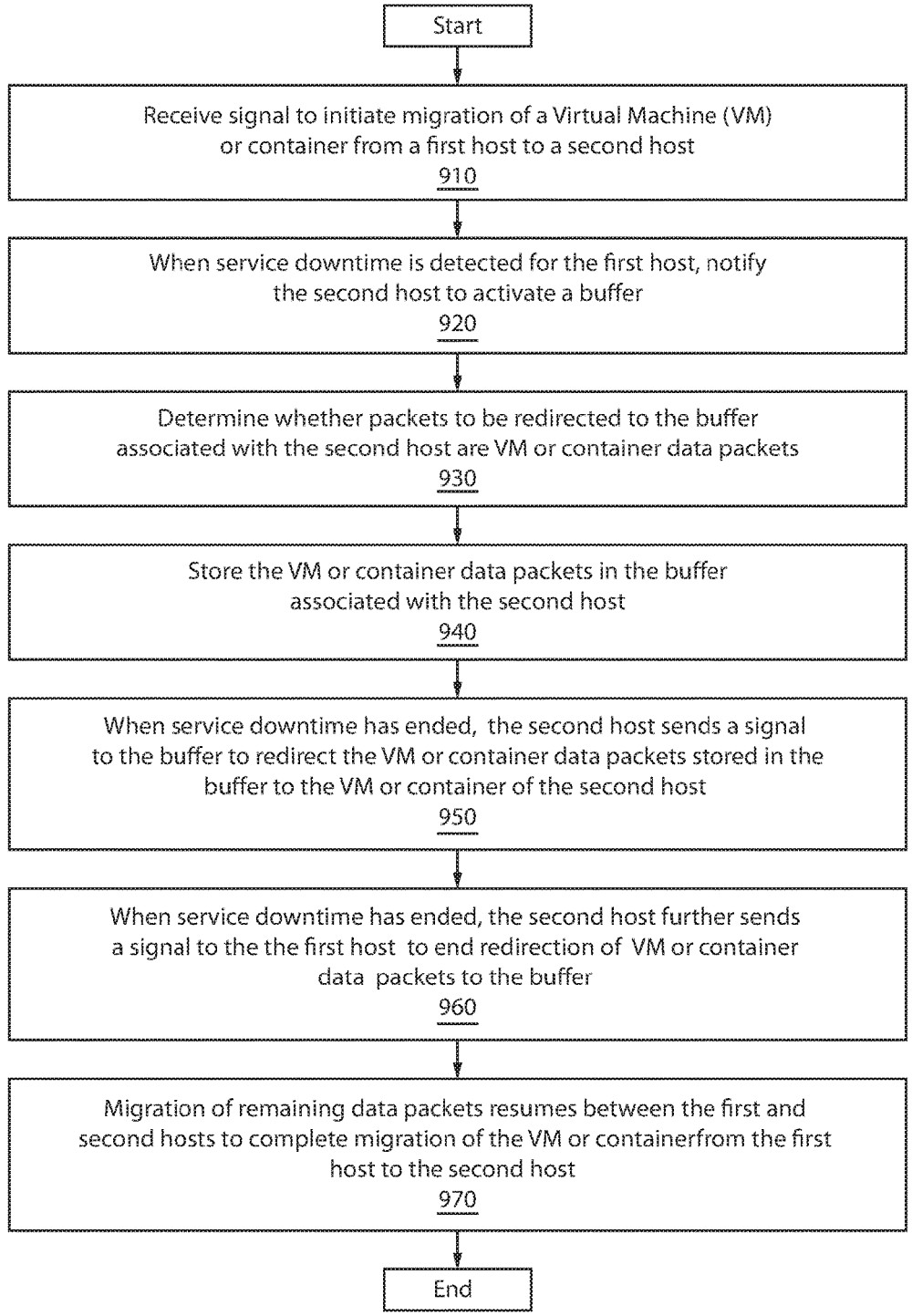
FIG. 9 is a block/flow diagram of an exemplary method for supporting virtual machine and/or container live migration where VM data packets are redirected from a first host to a buffer, in accordance with an embodiment of the present principles.

FIG. 9 is a block/flow diagram of an exemplary method for supporting virtual machine and/or container live migration, in accordance with an embodiment of the present principles.

At block 910, a signal is received to initiate migration of the VM or container from a first host to a second host.

At block 920, when service downtime is detected for the first host, the second host is notified to activate the buffer.

At block 930, is it determined whether the data packets to be redirected to the buffer associated with the second host are VM data packets or container data packets.

At block 940, the VM or container data packets are stored in the buffer associated with the second host.

At block 950, when service downtime has ended, the second host sends a signal to the buffer to redirect the VM or container data packets stored in the buffer to the VM or container of the second host.

At block 960, when service downtime has ended, the second host further sends a signal to the first host to end or terminate redirection of the VM or container data packets to the buffer.

At block 970, migration of the remaining data packets resumes between the first and second hosts to complete migration of the VM or container from the first host to the second host.

Figure 10:
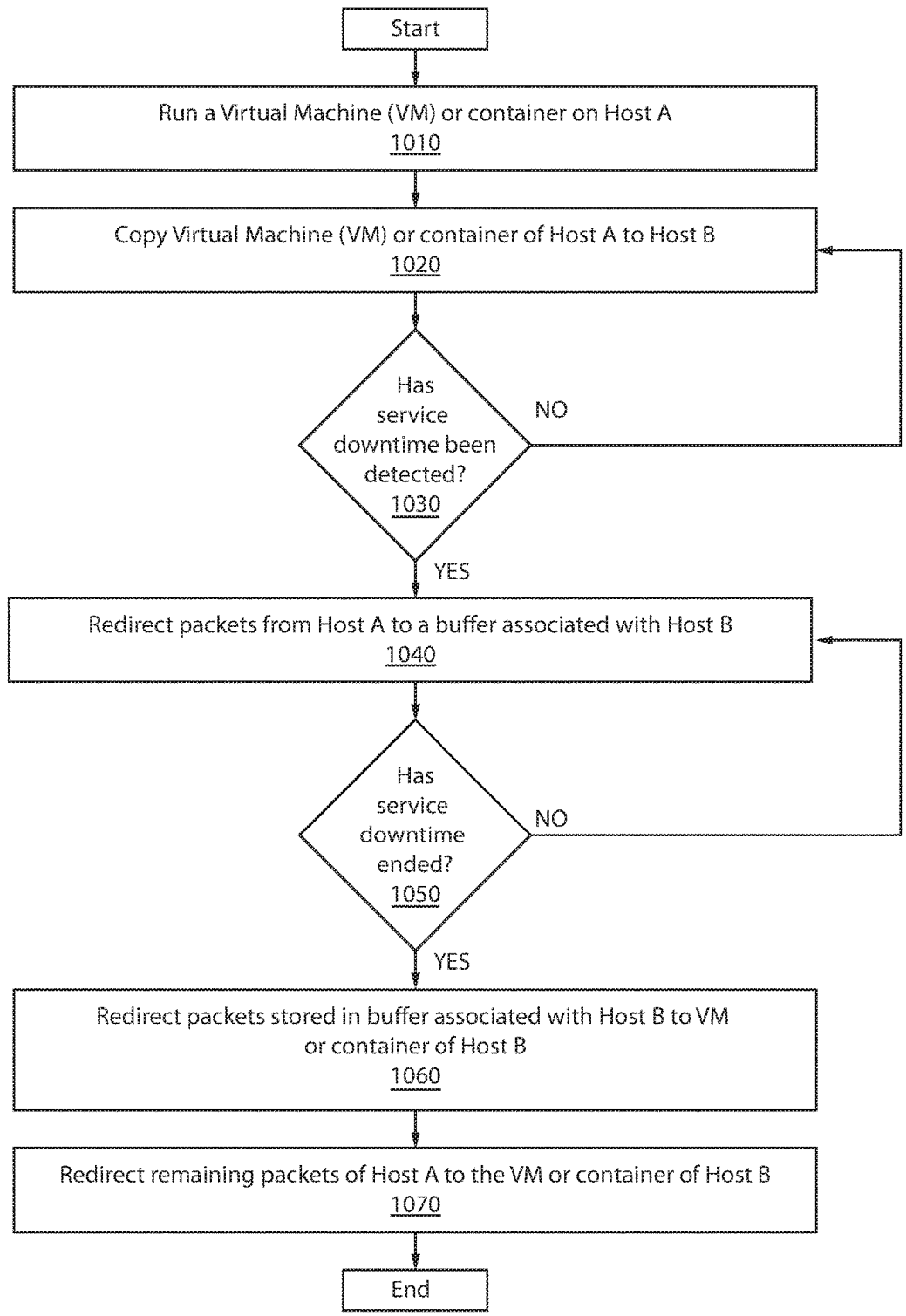
FIG. 10 is a block/flow diagram of an exemplary method for supporting virtual machine and/or container live migration where VM data packets are redirected from a buffer to a second host, in accordance with an embodiment of the present principles.

FIG. 10 is a block/flow diagram of an exemplary method for supporting virtual machine and/or container live migration, in accordance with an embodiment of the present principles.

At block 1010, running of a VM or container on Host A is performed.

At block 1020, the VM or container of Host A is copied to the VM or container of Host B.

At block 1030, a determination is made as to whether service downtime has been detected. If "NO," then the method resumes to block 1020. If "YES," the method proceeds to block 1040.

At block 1040, the VM or container data packets are redirected from Host A to a buffer associated or in communication with Host B.

At block 1050, a determination is made as to whether service downtime has ended. If "NO," then the method resumes to block 1040. If "YES," the method proceeds to block 1060.

At block 1060, the VM or container data packets stored in the buffer in communication with Host B are redirected from the buffer to the VM or container of Host B.

At block 1070, the remaining VM or container data packets of Host A are sent to the VM or container of Host B.

Figure 11:
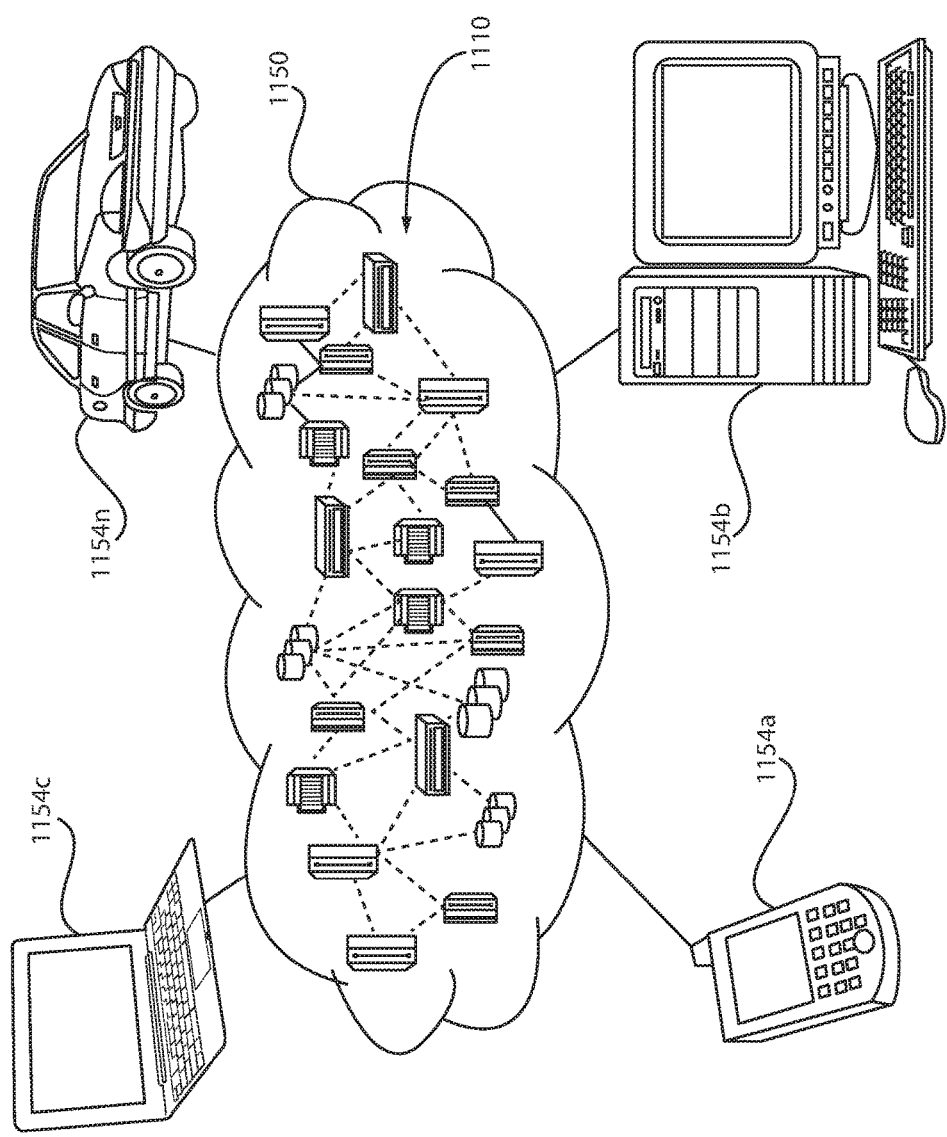
FIG. 11 is a block/flow diagram of an exemplary cloud computing environment, in accordance with an embodiment of the present principles.

FIG. 11 is a block/flow diagram of an exemplary cloud computing environment, in accordance with an embodiment of the present principles.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, containers, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 11, illustrative cloud computing environment 1150 is depicted for use with supporting virtual machine and/or container live migration. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. The network may also be a service migration network. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
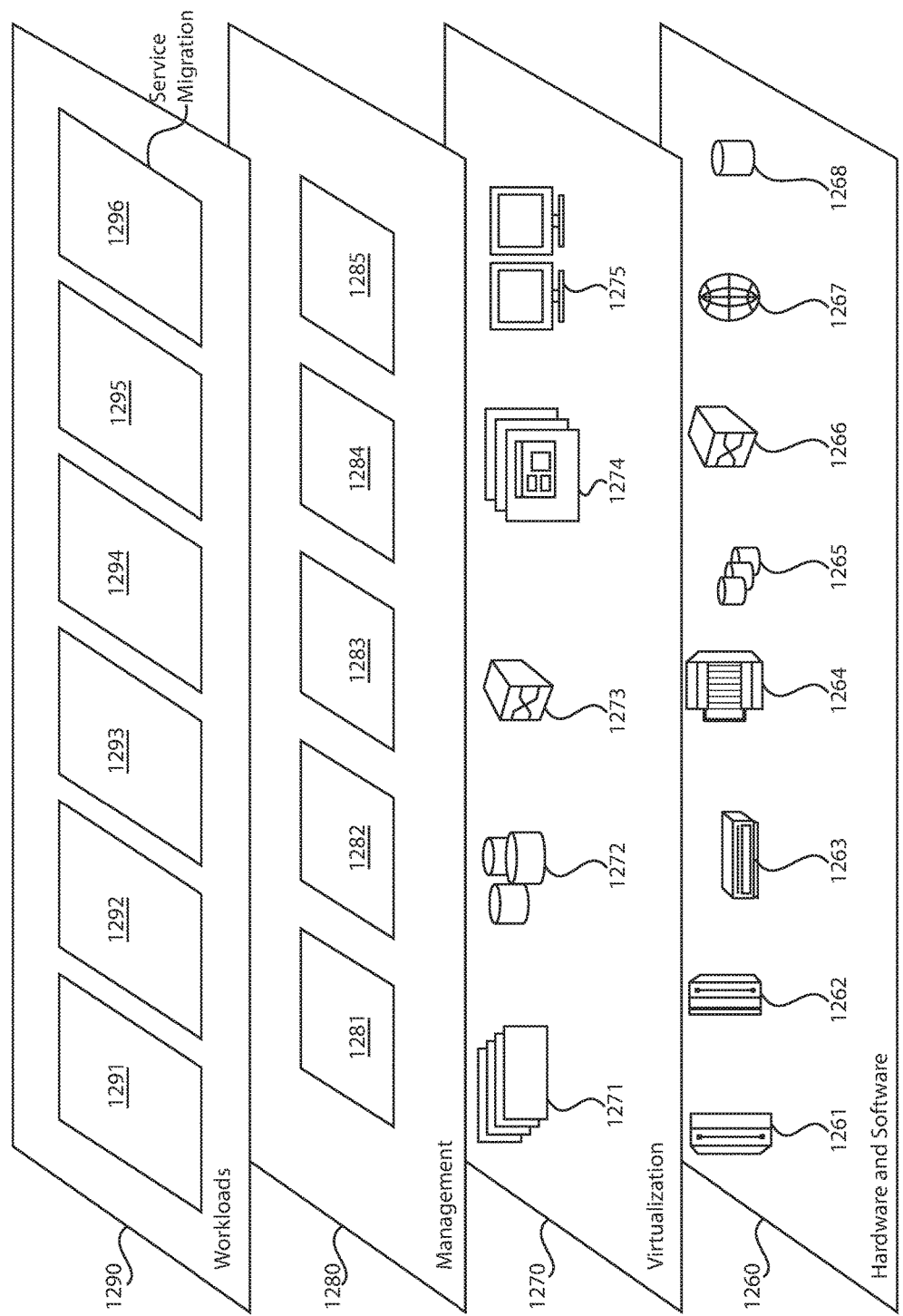
FIG. 12 is a schematic diagram of exemplary abstraction model layers, in accordance with an embodiment of the present principles.

FIG. 12 is a schematic diagram of exemplary abstraction model layers, in accordance with an embodiment of the present principles. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and service migration 1296 (including at least both VM migration and container migration and/or combinations thereof.

In some embodiments, a wide area network (WAN) tunneling facility may be used between two data centers. Tunneling, also known as "port forwarding," is the transmission of data intended for use only within a private, usually corporate network through a public network in such a way that the routing nodes in the public network are unaware that the transmission is part of a private network. Tunneling is generally done by encapsulating the private network data and protocol information within the public network transmission units so that the private network protocol information appears to the public network as data. Tunneling allows the use of the Internet, which is a public network, to convey data on behalf of a private network. One approach to tunneling is the Point-to-Point Tunneling Protocol (PPTP) developed by Microsoft® and several other companies. The PPTP keeps proprietary data reasonably secure, even though part of the path(s) between or among end users exists in public communication channels. The PPTP makes it possible for authorized users to gain access to a private network, called a virtual private network (VPN), through an Internet Service Provider (ISP) or online service.

In some embodiments, the buffering agent or buffering service may have TCP awareness. TCP awareness involves using a Snoop protocol. The Snoop protocol is a TCP-aware link layer protocol designed to improve the performance of TCP over networks of wired and single-hop wireless links. Further, the Snoop protocol is a protocol for maintaining cache coherency in symmetric multiprocessing environments. In a snooping system, all caches on the bus monitor (or snoop) the bus to determine if they have a copy of the block of data that is requested on the bus. Every cache has a copy of the sharing status of every block of physical memory it has. Multiple copies of a document in a multiprocessing environment typically can be read without any coherence issues. However, a processor must have exclusive access to the bus in order to write.

The main issue with TCP performance in networks that have both wired and wireless links is that packet losses that occur because of bit-errors are mistaken by the TCP sender as being due to network congestion, causing it to drop its transmission window and often time out, resulting in degraded throughput. The Snoop protocol works by deploying a Snoop agent at the base station and performing retransmissions of lost segments based on duplicate TCP acknowledgments (which are a strong indicator of lost packets) and locally estimated last-hop round-trip times. The agent also suppresses duplicate acknowledgments corresponding to wireless losses from the TCP sender, thereby preventing unnecessary congestion control invocations at the sender. This combination of local retransmissions based primarily on TCP acknowledgments, and suppression of duplicate TCP acknowledgments, is the reason for classifying Snoop as a transport-aware reliable link protocol.

There are two main types of snooping protocols, that is, write-invalidate and write-update snooping protocols. In the write-invalidate snooping protocol, the processor that is writing data causes copies in the caches of all other processors in the system to be rendered invalid before it changes its local copy. The local machine does this by sending an invalidation signal over the bus, which causes all of the other caches to check for a copy of the invalidated file. Once the cache copies have been invalidated, the data on the local machine can be updated until another processor requests it. In the write-update protocol, the processor that is writing the data broadcasts the new data over the bus (without issuing the invalidation signal). All caches that contain copies of the data are then updated. This scheme differs from write-invalidate in that it does not create only one local copy for writes.

Still yet, any of the components of the present invention could be created, integrated, hosted, maintained, deployed, managed, serviced, etc. by a service supplier who offers to provide a method for supporting virtual machine and/or container live migration with respect to a product or service. Thus the present invention discloses a process for deploying, creating, integrating, hosting, maintaining, and/or integrating computing infrastructure, including integrating computer-readable code into the computer system 100 (FIG. 1), wherein the code in combination with the computer system 100 is capable of performing a method for providing a method for supporting virtual machine and/or container live migration with respect to a product or service. In another embodiment, the invention provides a business method that performs the process steps/blocks of the invention on a subscription, advertising, and/or fee basis. That is, a service supplier, such as a Solution Integrator, could offer to provide a method for supporting virtual machine and/or container live migration with respect to a product or service. In this case, the service supplier can create, maintain, support, etc. a computer infrastructure that performs the process steps/blocks of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for supporting virtual machine live migration in a network, comprising:
hosting a virtual machine (VM) at a first location to be migrated to a second location by sending VM data packets from the first location to the second location;
detecting a predetermined event associated with the VM at the first location;
prompting, in response to detection of the predetermined event, a redirection of the VM data packets from the first location to a buffer located within the second location;
temporarily storing the VM data packets in the buffer located within the second location;
detecting an end of the predetermined event associated with the first location;
disabling the buffer; and
redirecting, in response to the end of the predetermined event, the VM data packets stored in the buffer to the VM migrated to the second location.

2. The method of claim 1, wherein the buffer is a virtual network interface card (VNIC) buffer.

3. The method of claim 2, further comprising increasing the VNIC buffer before the migration and restoring the VNIC buffer to an initial state after the migration.

4. The method of claim 1, wherein the predetermined event is a service downtime.

5. The method of claim 1, wherein the buffer is a temporary storage associated with a container.

6. The method of claim 1, further comprising sending a signal from the first location to activate the buffer located within the second location.

7. The method of claim 1, further comprising redirecting the VM data packets from the first location to the buffer by a switching device associated with the first location.

8. The method of claim 1, further comprising, when the predetermined event ends, sending a signal to the buffer to request transmittal of the stored VM data packets to the second location.

9. The method of claim 1, further comprising, when the predetermined event ends, sending a signal to the first location to discontinue redirection of the VM data packets to the buffer located within the second location.

10. A system for supporting virtual machine live migration in a network, comprising:
a virtual machine (VM) hosted at a first location, the VM migrated to a second location by sending VM data packets from the first location to the second location; and
a buffer located within the second location,
wherein, when a predetermined event occurs, the VM data packets are redirected from the first location to the buffer located within the second location, and when the predetermined event ends, the buffer is disabled and the VM data packets are redirected from the buffer to the VM migrated to the second location.

11. The system of claim 10, wherein the buffer is a virtual network interface card (VNIC) buffer.

12. The system of claim 10, wherein the buffer is a proxy cache.

13. The system of claim 10, wherein the buffer is a temporary storage associated with a container.

14. The system of claim 10, wherein the predetermined event is a migration service downtime event.

15. The system of claim 10, wherein the buffer is activated by a signal sent from the first location to the second location.

16. The system of claim 10, wherein, when the predetermined event ends, a signal is sent to the buffer from the second location to request transmittal of the stored VM data packets to the second location.

17. The system of claim 10, wherein, when the predetermined event ends, a signal is sent to the first location to discontinue redirection of the VM data packets to the buffer.

18. The system of claim 10, wherein a switching device at the first location is configured to redirect the VM data packets from the first location to the buffer.

19. A non-transitory computer readable storage medium comprising a computer readable program for supporting virtual machine live migration in a network, wherein the computer readable program when executed on a computer causes the computer to perform the steps of:
hosting a virtual machine (VM) at a first location to be migrated to a second location by sending VM data packets from the first location to the second location;
detecting a predetermined event associated with the VM at the first location;
prompting, in response to detection of the predetermined event, a redirection of the VM data packets from the first location to a buffer located within the second location;
temporarily storing the VM data packets in the buffer located within the second location;
detecting an end of the predetermined event associated with the first location;
disabling the buffer; and
redirecting, in response to the end of the predetermined event, the VM data packets stored in the buffer to the VM migrated to the second location.

20. The non-transitory computer readable storage medium of claim 19, further comprising, when the predetermined event ends, sending:
a first signal to the buffer to request transmittal of the stored VM data packets to the second location; and
a second signal to the first location to discontinue redirection of the VM data packets to the buffer.

* * * * *